April 21, 1970 P. O. KLIEM 3,507,617
THERMOMETRIC EMULSION SENSITOMETRY
Filed Aug. 29, 1967 3 Sheets-Sheet 1

INVENTOR.
Peter O. Kliem
BY Brown and Mikulka
and
Robert M. Ford
ATTORNEYS

April 21, 1970     P. O. KLIEM     3,507,617

THERMOMETRIC EMULSION SENSITOMETRY

Filed Aug. 29, 1967     3 Sheets-Sheet 2

INVENTOR.
Peter O. Kliem

BY

Brown and Mikulka
and
Robert M. Ford
ATTORNEYS

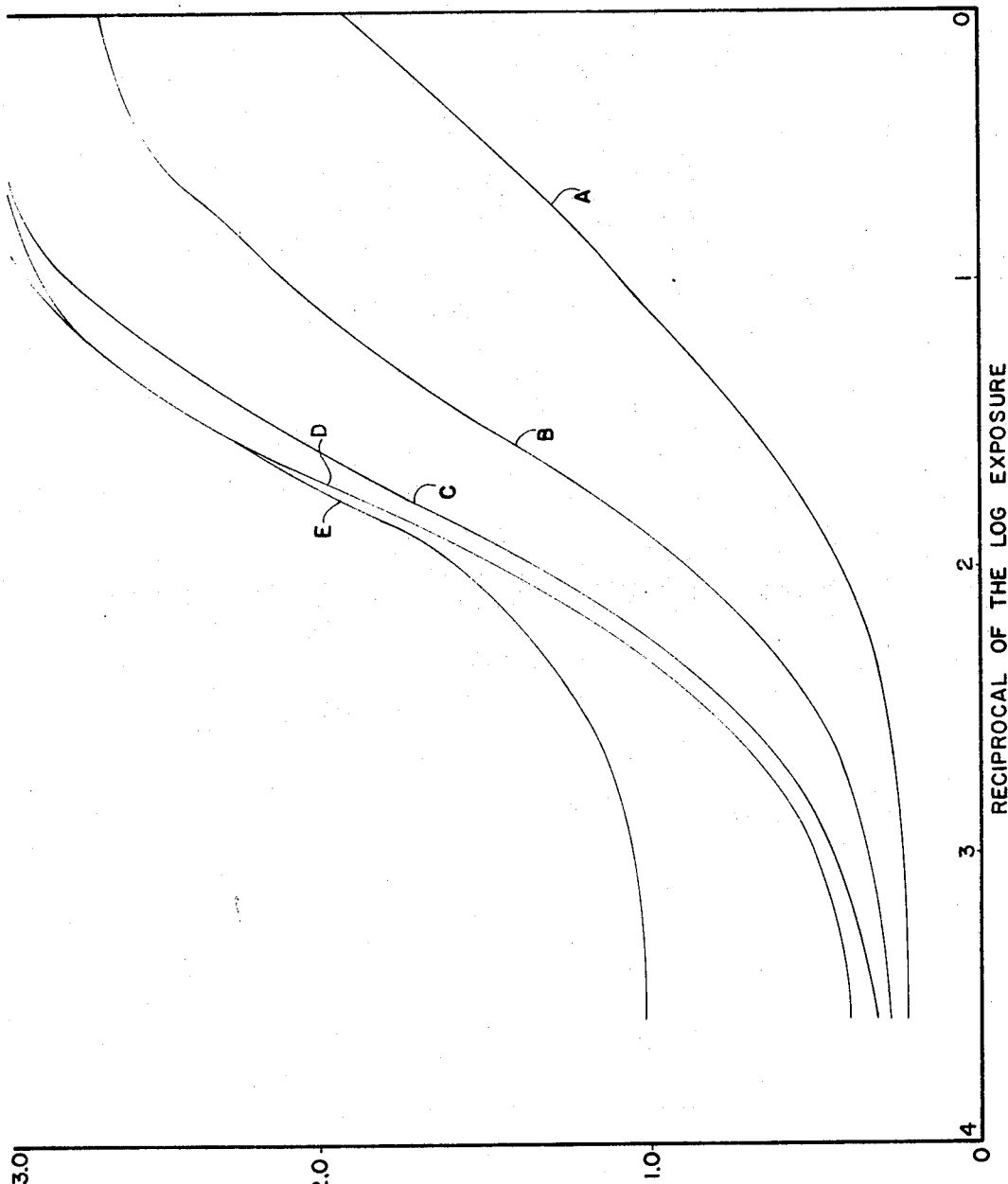

3,507,617
**THERMOMETRIC EMULSION
SENSITOMETRY**
Peter O. Kliem, Weston, Mass., assignor to Polaroid
Corporation, Cambridge, Mass., a corporation of
Delaware
Filed Aug. 29, 1967, Ser. No. 664,166
Int. Cl. G01n 25/48, 21/00, 33/00
U.S. Cl. 23—230                      23 Claims

ABSTRACT OF THE DISCLOSURE

Thermometric process for the measurement of the sensitometric characteristics of a photographic material in a fluid medium and apparatus particularly adapted to perform such process.

---

Figure 1:
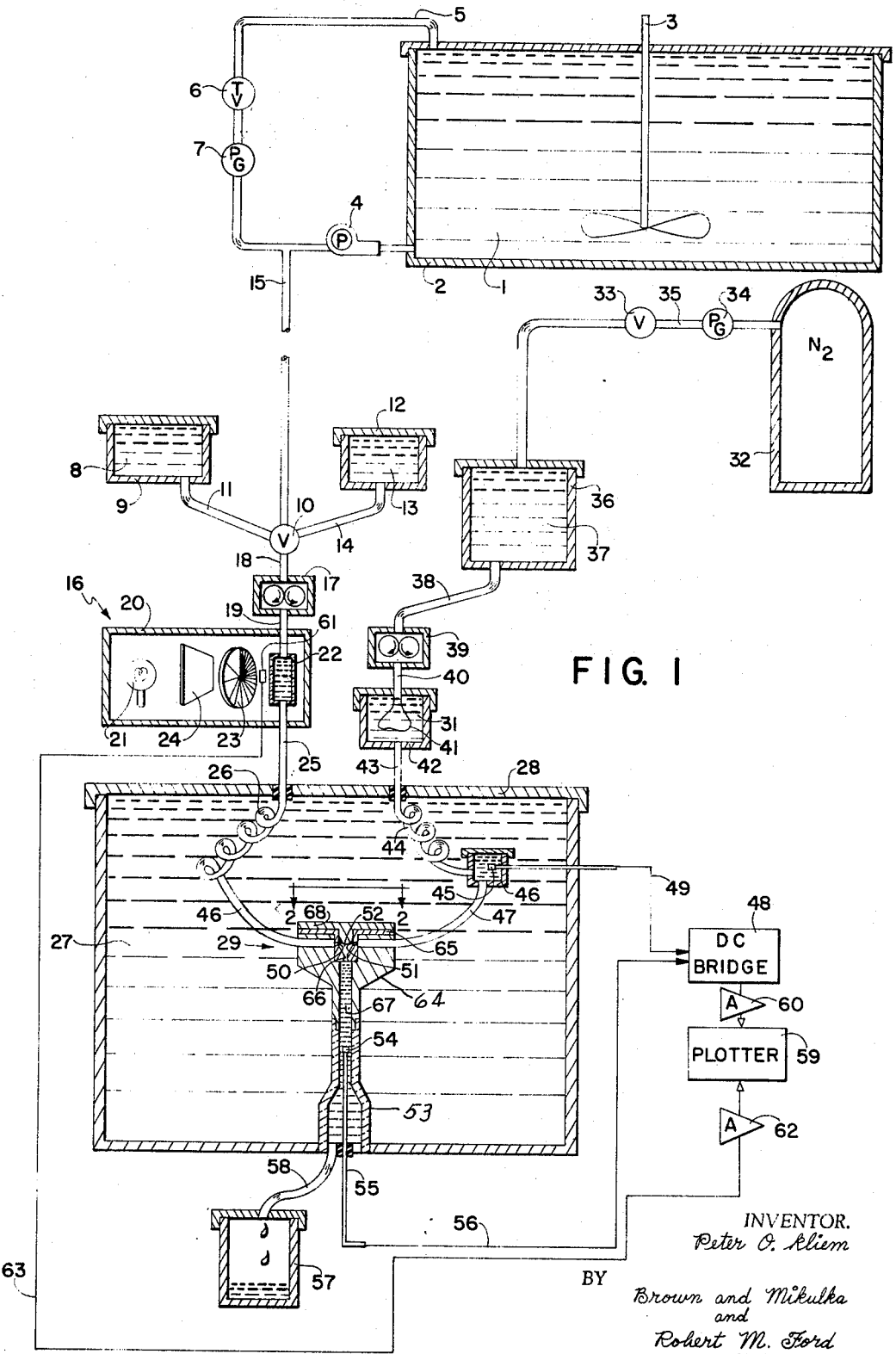

Conventional methods for determining the sensitometric characteristics of a photoresponsive material suspended in a fluid medium, for example, a fluid photographic emulsion, are so excessively time-consuming, employing procedures known in the art, that the sensitometric data obtained from individual test samples of such material, for example, at various stages during its preparation, is not available in sufficient time to permit modification of the production process for optimized preparation of such material.

In general, personnel concerned with the fabrication of photoresponsive materials are constrained for the most part by time-consuming conventional sensitometric methods which include sampling a photoresponsive material suspended in a fluid medium; coating the sampled material on an appropriate support; drying the thus coated sample; exposing the sample to actinic radiation; developing the exposed sample; and measuring the resultant image density produced as a function of the sample's response to the exposing radiation.

One attempt to simplify the traditional methods for determining the sensitometric characteristics of a photoresponsive material, and to increase the speed at which such information may be accurately generated, is described in U.S. Patent No. 2,590,830, issued Mar. 25, 1952 to Williford et al. According to the procedure described in that patent, the sensitometric characteristics of a photographic emulsion may be ascertained by exposing a photographic emulsion, in liquid form, to actinic radiation and the resultant exposed emulsion reduced, in a standardized manner with a photographic developer, to provide an optical density measurement of the developed liquid formation, as a function of the degree of emulsion exposure, directly correlating to the relative sensitometric characteristics of the emulsion as obtained by conventional test procedures.

In general, the present invention relates to a process for the determination of the sensitometric characteristics of a photoresponsive material and to specified apparatus particularly adapted to perform such process. In particular, the process of the present invention includes, in combination, the steps of exposing a photoresponsive material to radiation which is actinic thereto; contacting the exposed material with an agent which is thermically reactable with the material, as a function of the material's exposure to actinic radiation; and measuring the temperature change ($\Delta T$), as a function of the material's exposure, during reaction of the agent with the exposed material.

The process of the present invention thus includes the thermometric measurement of the net enthalpy of reaction between an exposed photoresponsive material and an agent thermically reactable with the exposed material as a function of such material's exposure to actinic radiation. Specifically, it has been found that the net enthalpy of the stated reaction provides precise quantitative results directly correlating to the response of a photosensitive material to incident actinic radiation, and functionally correlating to measurements of the material's sensitometric characteristics by the conventional procedures of the art. For example, the results derived by means of the process of the present invention functionally correlate directly to the conventional procedure for the measurement of the relative "speed" of the photosensitive material, that is, the empirically derived relative measurement which may be defined as a value representing the reciprocal of the exposure required to produce a given result as detailed hereinafter.

Any precise definition of "speed," however, is traditionally thus based upon the relative selection of a particular result as the standard reference point. A so-called precise quantitative measure of speed has been developed from the work of L. A. Jones et al., as reported in Mees, The Theory of the Photographic Process, the Macmillan Company, New York, 1944, chapters XIX and XXII. This work suggested a system in which negative sensitive materials are assigned a speed that is in terms of the exposure required to give a negative image from which a positive print of specified quality can be produced.

Based on this work, the American Standards Association, Incorporated, has established standards for rating sensitive materials for speed. Under such standards, emulsion speed is considered as a value inversely proportional to the minimum exposure which must be incident upon the negative material, from the scene element of minimum brightness in which detail is visible, in order that a print of excellent quality can be made from the resultant negative. These standards specify techniques for plotting the characteristic H&D curve of a negative material, that is, the curve relating the logarithm of the original exposure of the negative to density in said negative. The value of speed derived from the standard characteristic curve so determined is specified as equal to the reciprocal of the exposure, E, on the characteristic curve at which the slope is 0.3 times the average slope for a log exposure range of 1.5 of which E is the minimum exposure. The precise method for determining speed in this manner is described in detail in the publication of the American Standards Association, Incorporated, PH 2.5–1954, and titled "American Standard Method for Determining Photographic Speed and Exposure Index."

Accordingly, primary objects of the present invention are to provide a rapid access process particularly adapted for the precise determination of the sensitometric response characteristics of a photoresponsive material; to provide a rapid access process adapted for the precise determination of the sensitometric response characteristics of a photoresponsive material to actinic radiation of selected frequencies; to provide a rapid access process adapted for the precise determination of the sensitometric response characteristics of a photoresponsive material to actinic radiation of selected intensities; to provide a rapid access process adapted for the precise determination of the sensitometric response characteristics of a fluid photoresponsive composition; to provide a rapid access process adapted for the precise determination of the effects of adjuncts upon the sensitometric response characteristics of a photoresponsive material; to provide a rapid access process adapted for the continuous monitoring of the sensitometric response characteristics of photoresponsive material; and to provide apparatus particularly adapted to effect performance of the foregoing processes.

Other objects of the present invention will in part be obvious and will in part appear hereinafter.

The invention accordingly comprises the method involving the several steps and the relation of one or more of such steps with respect to each of the others, and the apparatus possessing the construction, combination of elements and arrangement of parts which are exemplified in the following detailed disclosure and the scope of the application of which will be indicated in the claims.

Figure 2:
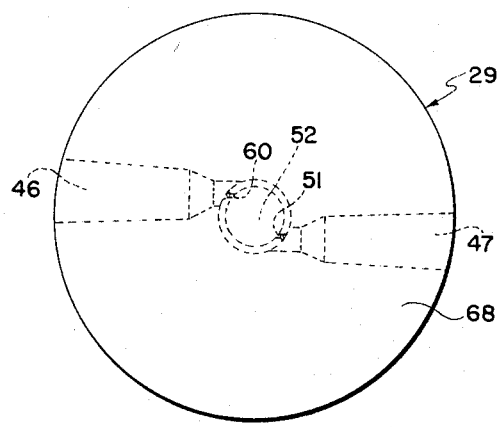

For a fuller understanding of the nature and objects of the present invention, reference should be had to the following detailed description taken in connection with the accompanying drawings wherein:

FIGURE 1 is a diagrammatic partially schematic cross-sectional view showing an embodiment of apparatus, constructed in accordance with the present invention for carrying out an embodiment of the process of the present invention;

FIG. 2 is a diagrammatic top view, along line 2—2 of FIGURE 1, showing an embodiment of a turbine mixer employed in apparatus constructed in accordance with FIGURE 1; and FIG. 3 is a graphic illustration of the log exposure-temperature relationship signal generated during the hereinafter detailed illustrative performance of an embodiment of the process of the present invention employing apparatus constructed in accordance with FIGURE 1.

For the production of photoresponsive material such as photosensitive silver halide emulsions, preferably gelatino silver halide emulsions, the photoresponsive silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or alternatively, employing any of the various floc systems, or procedures, adapted to effect removal of such undesired components, for example, the procedures described in U.S. Patents Nos. 2,614,928; 2,614,929; 2,728,662; and the like; after-ripening the dispersion at an elevated temperature in combination with the addition of gelatin and various adjuncts, for example, chemical sensitizing agents of U.S. Patents Nos. 1,574,944; 1,623,499; 2,410,689; 2,597,856; 2,597,915; 2,487,850; 2,518,698; 2,521,926; and the like; all according to the traditional procedures of the art, as described in Neblette, C. B., Photography Its Materials and Processes, 6th ed., 1962.

Optical (spectral) sensitization of the emulsion's silver halide crystals may be accomplished by contact of the emulsion composition with an effective concentration of the selected optical sensitizing dyes dissolved in an appropriate dispersing solvent such as methanol, ethanol, acetone, water, and the like; all according to the traditional procedures of the art, as described in Hamer, F. M., The Cyanine Dyes and Related Compounds.

Additional optional additives, such as coating aids, hardeners, viscosity-increasing agents, speed-increasing agents, stabilizers, preservatives, and the like, for example, those set forth hereinafter, also may be incorporated in the emulsion formulation, according to the conventional procedures known in the photographic emulsion manufacturing art.

The photoresponsive material of the photographic emulsion will, as previously described, preferably comprise a crystal of silver halide, for example, one or more of the silver halides such as silver chloride, silver iodide, silver bromide, or mixed silver halides such as silver chlorobromide or silver iodobromide, or varying halide ratios and varying silver concentrations.

As the binder for the emulsion, the aforementioned gelatin may be, in whole or in part, replaced with some other colloidal material such as albumin; casein; or zein; or resins such as a cellulose derivative, as described in U.S. Patents Nos. 2,322,085 and 2,327,808; polyacrylamides, as described in U.S. Patent No. 2,541,474; vinyl polymers such as described in U.S. Patents Nos. 2,253,078; 2,276,322; 2,276,323; 2,281,703; 2,310,223; 2,311,058; 2,311,059; 2,414,208; 2,461,023; 2,484,456; 2,538,257; 2,579,016; 2,614,931; 2,624,674; 2,632,704; 2,642,420; 2,678,884; 2,691,582; 2,725,296; 2,753,264; and the like.

The sensitometric response characteristics of a photoresponsive material such as a photosensitive silver halide emulsion to actinic radiation is a function of substantially all factors entering into fabrication of the emulsion formulation, including both material and environmental input factors.

In general, control of the input factors during photosensitive emulsion fabrication has been traditionally an open-loop system of necessity. Specifically, no sensitometric control system has been developed, until the present invention, which provides sufficiently rapid access to the precise analytical data required to be available for inprocess monitoring of the production procedure and, particularly, rapid access to the continuous inprocess control data required for the continuous monitoring of the production procedure.

Engineering efforts to date have been expended mainly, as a practical matter, in providing precise control of all the recognized physical input variables and especially those derived from the raw materials employed in the fabrication procedure. However, photosensitive silver halide emulsion formulations commercially employed exhibit a sensitivity to input variables greatly exceeding known physical and chemical methods of measuring the pertinent input variables, especially with respect to the inherent variability of raw materials employed and, particularly, those raw materials derived from naturally occurring sources such as gelatin, and the like.

The lack of the availability of a process adapted to provide sufficiently rapid inprocess access to data regarding the sensitometric characteristics of a photosensitive silver halide emulsion, during formulation, has resulted in the traditional batchwise production of emulsions exhibiting variability in their sensitometric response characteristics. Such variabilty has been required to be minimized by the blending of various emulsion batches, in selected ratiometric quantities, based upon the respective characteristics of the individual formulations as derived from conventional postfabrication sensitometric procedures. Thus, the final composite product of more consistent characteristics is necessarily of lower than optimal quality, and the extent of this dilution of quality is, of course, dependent on the range of variability in the emulsion formulations which have been combined.

As previously mentioned, all sensitometric procedures known in the art, for the stated purpose, are so time-consuming that they cannot, at their present state of development, be adapted to effect a closed-loop system for controlling the fabrication of a photosensitive silver halide emulsion. This is especially true in that the sensitometric characteristics of a finished photosensitive silver halide emulsion are extremely dependent on the time and temperature employed during the ripening and after-ripening stages of emulsion fabrication, and in particular the latter, as well as the types and quantities of raw materials employed for the production of the emulsion.

As an example, both the fog and the speed of a photosensitive silver halide emulsion formulation usually increase continuously with ripening and especially with after-ripening time and/or temperature; hence, for any particular emulsion formulation, those ripening and after-ripening times and/or temperatures should be employed which produce the highest speed to fog ratio, that is, signal to noise ratio, at which the fog base line, noise level, is not excessive. Obviously, therefore, variations of the sensitometric characteristics of a particular emulsion, for example, due to the nonuniformity of raw material and other factors influencing the rate of after-ripening, can be at least partially offset by compensating variations of the operating conditions under which the emulsion is produced and, in particular, the times and temperatures employed during the ripening and after-ripening stages of production. However, as stated above, the operations of traditional sensitometry are so time-consuming that they cannot be used for such monitoring and control of the preparation of an emulsion. By the time the results of testing a sample of a particular emulsion by conventional means are available, the ripening or after-ripening of that emulsion has been completed. What is needed, therefore, is a method of evaluating the sensitometric characteristics of a photosensitive silver halide emulsion which is rapid enough to permit access to the data obtained therefrom in a sufficient time sequence to allow modification of the operating conditions under which the emulsion is being produced. The present invention provides such process of rapid sensitometry and apparatus particularly adapted to effect the process.

As previously mentioned, the present invention includes a rapid access process, for example, a signal readout of less than about 10 seconds per point, for the precise determination of the sensitometric response characteristics of a photoresponsive material, suspended in a fluid medium, to radiation actinic to the material, which comprises the steps of exposing the material to actinic radiation, contacting the material with an agent thermically reactable with the material, as a function of exposure, and measuring temperature change as a function of the material's exposure, and apparatus particularly adapted by construction to perform such process.

It has been specifically discovered that the net reaction enthalpy denoted is not only thermic but, for example, when a photosensitive silver halide emulsion is subjected to incident actinic radiation and contacted with an agent thermically reactable with photoexposed silver halide such as a silver halide developing agent, the changes in reaction enthalpy, as a function of photoexposure, directly correlate to the quantitative reduction of photoexposed silver halide to silver during the resultant oxidation-reduction reaction. Thus, the signal response generated by the process of the present invention is substantially in terms of the absolute quantity of photoexposed silver halide reduced to silver, during the oxidation-reduction development procedure, in contradistinction to the traditional prior art procedures which generate a signal response in terms of, and as a function of, the optical density of silver produced, which latter signal is dependent upon the physical conformation of, as well as the quantity of, silver produced.

Referring now to FIGURE 1 of the drawings, there is shown a diagrammatic, partially schematic, cross-sectional view of an illustrative embodiment of apparatus constructed in accordance with the present invention and particularly adapted to effect the process described.

As schematically shown in FIGURE 1, a photosensitive silver halide emulsion 1 during its fabrication in a vessel 2, agitated by mixer 3, is circulated by means of centrifugal pump 4 through conduit 5, at a constant pressure maintained by adjustment of control valve 6 in response to pressure gauge 7.

A photosensitive silver halide emulsion 8, having standardized sensitometric response characteristics, is retained in a vessel 9 having an outlet port connected to valve 10 by conduit 11. Valve 10 is additionally interconnected with tank 12, containing distilled water 13, for instrument flushing purposes, through conduit 14 and to conduit 5, through which is circulating photosensitive silved halide emulsion 1, through conduit 15.

By selective adjustment of valve 10, photosensitive silver halide emulsions 1 and 8 and distilled water 13 may be individually supplied to exposure station 16 of the apparatus, for example, in the desired alternating sequence.

The rate of material flow from valve 10 to exposure station 16 of the apparatus may be effectively controlled by employment of a positive pressure pump 17, for example, a commercially available gear pump, powered by a drive motor, not shown, intermediate material transport conduits 18 and 19.

Exposure station 16 comprises a housing containing a source 21 of electromagnetic radiation, including X-ray or radioactive emission, where desired, actinic to photosensitive emulsions 1 and 8, for example, a prefocused, internal reflection projection lamp, for directing radiation on a conduit 22 transmissive to the incident radiation, for example, a transparent glass capillary exposure tube, containing photosensitive emulsion continuously fed into conduit 22 from conduit 19. The electromagnetic radiation employed to effect exposure of emulsion in exposure conduit 22 may be selectively filtered continuously or intermittently to provide predetermined radiation gradient intensities and/or frequencies, as desired by the operator, such as by the interpositioning of appropriate radiation modulating means intermediate source 21 and exposure conduit 22, for example, as illustrated, the interpositioning of a circular, continuously varying density wedge 23 such as those composed of carbon selectively deposited on a glass or other transparent support or any other appropriate material which provides for the relatively uniform selective attenuation of the radiation employed, and/or spectral filters selectively restricting radiation incident on the exposure conduit to predetermined frequencies.

It will be recognized that a monochromatic radiation source may also be substituted for radiation source 21 for providing radiation of selected wavelengths. A synchronous drive motor, not shown, may be used to rotate illustrative density wedge 23, and other automatic controls may be adapted as desired and as would be obvious to one skilled in the art. In the preferred embodiment shown, an infrared heat filter 24 is positioned intermediate source 21 and wedge 23 to prevent radiant heating of emulsion in exposure conduit 22.

Subsequent to exposure, photoexposed emulsion is transported by conduit 25 to heat exchanger 26 which is immersed in a constant temperature water bath 27 in vessel 28. The water bath may be kept at a constant temperature, for example, $45° \pm 0.01°$ C., by conventional means, not shown, but which are readily available in the commercial market.

Upon emergence from heat exchanger 26, the photoexposed emulsion, now at the temperature of the water bath, enters tangential jet mixer 29 through conduit 30. At the same time, a fluid developer composition 31 enters mixer 29 and is combined with the emulsion.

The developer solution 31, preferably having a lower viscosity than that of the emulsion, may be fed into the system at a constant velocity by means of the following system. An inert gas such as nitrogen from a tank 32, at a flow rate control by valve 33 responsive to pressure gauge 34, supplies through conduit 35 a pressure head of gas to vessel 36 retaining a high viscosity fluid 37, for example, glycerin, mineral oil, or the like. Fluid 37 is forced by the gas pressure head through conduit 38 to positive pressure pump 39, for example, a commercially available high pressure gear pump, which is powered by a suitable drive motor, not shown. Pump 39 delivers the viscous fluid through conduit 40 into expandable rubber balloon 41 disposed in fluid developer composition 31 retained in tank 42 or, where immiscible and functionally inert, directly into developer composition 31. Composition 31, as a result of the expansion of balloon 41, is forced through conduit 43 at a constant velocity proportional to the expansion of balloon 41 which, in turn, is effected at a rate determined by the quantity of fluid 37 delivered to balloon 41 by pump 39. The developer solution 31 enters heat exchanger 44, which is immersed in constant temperature water bath 27 contained in tank 28, whereat it is equilibrated with the temperature of the photoexposed emulsion. The temperature of the developer is then monitored by thermistor 45 in chamber 46, intermediate heat exchanger 44 and conduit 47, subsequent to equilibration of developer 37 in heat exchanger 44 and before the developer enters tangential mixer 29 through conduit 47. A suitable thermistor comprises commercially available Fenwal Electronic G 794 thermistor. The signal generated by thermistor 45 is fed to D.C. bridge circuit 48 by leader 49 whereat it is compared with the temperature derived signal generated by an identical thermistor 54 during reaction of the developer 37 with the emulsion subsequent to intermixing in tangential mixer 29.

Extent of reaction and temperature change are a function of exposure. Temperature is monitored within adiabatic chamber 53 by thermistor 54 which may be attached to the end of movable probe 55. The signal from thermistor 54 is fed to a D.C. bridge 48 by leader 56. Probe positioning determines the time duration of reaction before temperature measurement by thermistor 54 and may be be adjusted to set the time base line for a series of different compositions or may be moved to determine the kinetics of the development of emulsion as a function of time. Suitable continuous motive means may be employed to variably locate the probe such as a drive motor in combination with a screw feed or similar devices as would be obvious to one skilled in the art. Spent composition may be drained from adiabatic chamber 53 into waste container 57 through pipe 58 and appropriately disposed of.

D.C. bridge circuit 48 produces a signal voltage output proportional to the temperature differential derived by comparing the output of the thermistors 45 and 54. This generated signal may be amplified by amplifier 59 and recorded by an automatic plotter 60, for example, a commercially available Moseley Autograph Recorder Model 7100 B, to provide a sensitometric curve, directly related to a density vs. log exposure H&D curve of the prior art, obtained by controlling the response of the X axis of the plotter with the D.C. bridge circuit output signal and the Y axis with a log exposure signal proportional to the exposing radiation from exposure station 16 as monitored by photoelectric cell 61, amplified by log amplifier 62 and fed to plotter 59 by leader 63.

Alternatively, or in addition to curve plotting, the output signal may be directly employed to control feedback mechanisms of appropriate design to alter the environmental or material parameters of the emulsion production process.

The construction of tangential jet mixer 29, as shown in FIGS. 1 and 2, taken together, is particularly adapted to provide a turbulent non-laminar mixing of the developer and emulsion which results in a highly efficient uniform reaction between the two fluids and specifically adapted to employ small quantities of each solution, for example, less than about 50 cc. per minute. Developer to emulsion ratio will, of course, depend upon the specific composition of each, but a three-to-one proportion of about 45 cc./min. to 15 cc./min. feed ratio has been found typical of a mix which produces optimum results employing the developer formulation set forth hereinafter and a conventional emulsion formulation. Tangential inlet jets 50 and 51 and mixing chamber 52 may vary in size according to the viscosity of the feed stock solutions and in the last-mentioned embodiment will preferably range from about 0.007 to 0.012 of an inch in diameter.

As each solution in such embodiment passes through its associated jet, mixing generally occurs in about $10^{-3}$ seconds as the liquids enter mixing chamber 52 at velocities approaching 30 meters/sec. Mixing is achieved in the mixing chamber by random combination of the liquids after which the composite mixture is forced by internal pressure into glass adiabatic reaction chamber 53.

In general, tangential jet mixer 29 may comprise a body 64 enclosing and supporting a laterally flanged annulus 65, intermediate its walls at the upper portion thereof, which laterally circumscribes mixing chamber 52 having a strictured outlet port 66 exiting to conduit 67. Conduit 67, in turn, exits into adiabatic chamber 53. Annulus 65 is maintained in position, in part, by cover plate 68 engaging the lateral flanges of the annulus and additionally provides the upper wall of mixing chamber 52.

Variations in the illustrative configuration of the embodiment of the invention described will be readily apparent to those skilled in the art. For example, the radiation source can be placed directly within the exposure conduit; the emulsion and developer may be mixed prior to, or during, exposure rather than thereafter; multiple feeds of various emulsions and developers can be, for example, sequentially fed to the reaction and thermal measuring sections of the apparatus, thus allowing a central production control system for a plurality of individual emulsion manufacturing processes; and the like.

Where it is desired to examine the modifying effect of various adjuncts such as optical sensitizing dyes, chemical sensitizing agents, color formers, solvents, impurities, stabilizers, antifoggants, speed increasing agents, surfactants, hardening agents, and the like, on the properties of a photoresponsive material, the process of this invention may be used to provide a rapid determination of the change in sensitometric characteristics caused by additives.

Experiments performed employing the process of the invention and the apparatus described above clearly established that the results obtained thereby are substantially the functional equivalent to the optical density measurements obtained by conventional sensitometric procedures. Specifically, employing the compositions designated hereinafter, at the flow rates stated above, resolution of the process has been found to be $\pm 0.002°$ C., which is better than $\pm 0.01$ of an exposure stop, and the repeatability of the system, when compared with conventional sensitometric methods, over a wide range of conditions, has been found to be $\pm 0.015$ log $E$ or $\pm 0.05$ of an exposure stop.

Thermal noise employing the apparatus described, with the stated developer flow, is $\pm 0.002°$ C. Thus, the apparatus described for the practice of the rapid thermometric sensitometry method contributes far less to the overall discrepancy in repeat measurements, under like conditions, than the variation in emulsion or developer properties which occurs with the passage of time for the same materials.

It will thus be recognized that the instant thermometric method with its increased flexibility and speed offers the stated advantages over conventional methods and provides results which are repeatedly and demonstrably within $\pm 0.05$ of an exposure stop under similar conditions.

The present invention will be illustrated in greater detail in conjunction with the following procedure which sets out a representative embodiment and utilization of the process and apparatus of this invention, which, however, is not limited to the details therein set forth and is intended to be illustrative only.

An emulsion was formulated as follows: a dispersion was formed of 50 grams of silver nitrate, 75 grams of ammonium bromide, and 1.1 grams of potassium iodide, in 62 grams of 5.5% trimellitic acid anhydride derivatized gelatin in 650 cc. of water, and maintained at a temperature of 72° C., under agitated conditions, for a period of 60 minutes. The resultant dispersion was flocculated by the addition of 8 cc. of 2 N sulfuric acid until a pH of about 2.5 was obtained. The flocculant was separated from the reaction mixture by decantation and washed with water to a conductivity of about 200 micromhos/cm. at 8° C. 32 grams of active gelatin and 25 cc. of water were then added to the dispersion, with agitation, and the mixture after-ripened for 75 minutes at a temperature of 60° C. and a pAg of 8.7.

The sensitometric response characteristics of the emulsion formulation were measured continously, during the after-ripening period. Representative curves at time intervals of 5, 15, 30, 60 and 120 minutes are shown, employing the apparatus described above, and a silver halide developing composition comprising 1000 cc. of water, 100 grams of anhydrous sodium sulfide, 3 grams of potassium thiosulfate, 3 grams of benzyl-α-picolinium bromide, 20 grams of benzotriazole, 150 grams of potassium hydroxide and 75 grams of methyl phenyl hydroquinone, and the mixing proportions and flow rate previously detailed.

The results obtained are graphically set forth in FIG. 3, specifically denoting the stated log exposure-temperature relationship wherein the X axis denotes Δ temperature and the Y axis denotes Δ log exposure, and Curves A, B, C, D and E represent the sensitometric response characteristics of the emulsion formulation at after-ripening intervals of 5, 15, 30, 60 and 120 minutes, respectively.

The development reaction of primary interest in the illustrative preferred embodiment of the invention, i.e., the selective reduction of photoexposed silver halide to silver, may be schematically written for purposes of simplicity as

Such other heat producing reactions which occur as a function of a photosensitive emulsion's exposure, including those which depend quantitatively on the extent of the last-identified reaction, result in desirable amplification of the signal generated. For example, the tanning of gelatin by spent developer oxidation products, for example, quinone when produced, which cross-link gelatin, provides amplification of the signal directly proportional to the development reaction, depending upon the formation of such agents as a by-product of the development reaction. Such cross-linking, however, may increase the viscosity of the developer solution, and it may be desirable, in a given instance, to suppress this particular reaction to eliminate any fluid flow problems, for example, by the addition of an inhibitor, such as sodium sulfite in the case of quinone production, to the developer formulation which will neutraliz the cross-linking activity produced in the development reaction. Such reactions effectively prevent cross-linking and, in certain instances, also produce heat directly proportional to the development reaction. Complex reactions such as regeneration of spent developer species by, for example, hydroxylation and the like mechanisms also add to the thermal change, as a quantitative function of the development of the photoexposed silver halide emulsion.

In the practice of the present invention, however, the potential contribution of extraneous reactions to the net enthalpy which are not a function of exposure and/or development should be avoided where possible, or if not possible or desirable, the contribution should be filtered out of the system by establishment of the thermal base line of the process to be performed.

For example, activation of a developer composition by addition of an alkali may produce a heat of neutralization resulting from the combination of a very weak acid and strong base. This heat, extraneous to the process, may be eliminated from the system by dissolving the developer in alkali, allowing neutralization to occur and then readjusting the solution to a desired temperature prior to utilization. Reactions which are not a function of exposure or development but are predictably constant such as the neutralization reaction between alkali and the carboxyl groups of gelatin, especially gelatin that has been derivatized with an acid anhydride or the like which yields additional acid groups, kinetic energy dissipation due to changes in the velocity of fluid flow, etc., are measurable constants and may be easily factored out of the process results by establishment of the thermal base line of the specific process performed.

Although the process of the present invention has been described in terms of the preferred photoresponsive material, that is, photosensitive silver halide and particularly photosensitive gelatino silver halide emulsions, the most commonly employed photoresponsive material, it will be readily recognized that the present invention may equally be employed to analyze the sensitometric response characteristics of the various photoresponsive materials of the art, for example, photosensitive copper, mercury, zinc, cadmium, lead and thallium, and the like salt systems; photoresponsive silver salt systems, in addition to the previously described silver halide systems, such as oxalate, tartrate, nitrate, and the like, systems; chromate and dichromate systems; diazo systems; and the like.

In addition, although the process of the present invention has been illustrated in terms of the perferred exothermic type reaction system and the specific employment of methyl phenyl hydroquinone as the agent exothermically reactable with the preferred photoresponsive material as a function of its exposure, it will be readily recognized that any agent or agents endo- or exothermically reactable with a photoexposed photosensitive material, as a function of exposure, may be employed in the practice of the present invention.

In general, in a preferred embodiment of the invention the agent or agents selected for employment with the aforementioned preferred photoresponsive material will comprise an agent exothermically reactable therewith, as a function of photoexposure, and, most preferably, a silver halide developing agent. An extensive compilation of such agents both inorganic and organic as are contemplated for employment in the practice of the present invention are set forth in Mees-James, The Theory of the Photographic Process, 3rd ed., 1966, chapter 13; Neblette, C. B., Photography Its Materials and Processes, 5th ed., 1952, chapter 13; Glafkides P., Photographic Chemistry, vol. 1, 1958, chapter 9; the U.S. patents classified in Class 96–Subclass 66; etc.

Preferred silver halide developing agents will generally comprise benzenoid type silver halide developing agents, especially those benzenoid agents which comprise a 6-membered aromatic ring system possessing at least two hydroxyl and/or amino group substituents, at least one of which is substituted in one of ortho or para positions on the ring with respect to one other of the substituents, and, in particular, 1,4-dihydroxybenzene (hydroquinonyl) type agents.

Since certain changes may be made in the above process and apparatus without departing from the scope of the invention herein involved, it is intended that all matter contained in the above description and shown in the accompanying drawings shall be interpreted as illustrative and not in a limiting sense.

What is claimed is:

1. Apparatus for the determination of the sensitometric characteristics of a photoresponsive material in a fluid medium to radiation actinic to said material which comprises, in combination:

(a) means for exposing said material to radiation actinic thereto;

(b) means for contacting said material with an agent thermically reactable with said material as a function of exposure of said material to said actinic radiation; and (c) means for measuring the temperature change as a function of said exposure of said material during reaction of said agent with said exposed material.

2. Apparatus as defined in claim 1 wherein said means for exposing said material to radiation actinic thereto includes means for varying the intensity of said radiation.

3. Apparatus as defined in claim 1 wherein said means for exposing said material to radiation actinic thereto includes means for varying the frequency range of said radiation.

4. Apparatus as defined in claim 1 which includes means for causing said material in a fluid medium to flow in a stream at a substantially uniform rate, and means for introducing said agent thermically reactable with said material into said stream at a substantially uniform rate.

5. Apparatus as defined in claim 4 wherein said means for exposing said material to radiation actinic thereto includes means for varying the intensity of said radiation.

6. Apparatus as defined in claim 4 wherein said means for exposing said material to radiation actinic thereto includes means for varying the frequency range of said radiation.

7. Apparatus as defined in claim 1 wherein said means for measuring said temperature change as a function of said exposure of said material during said reaction of said agent with said exposed material includes means for generating an electrical signal proportional to said temperature change.

8. Apparatus as defined in claim 7 including means for amplifying said generated signal.

9. A process for the determination of the sensitometric characteristics of a photoresponsive material in a fluid medium to radiation actinic to said material, which process comprises, in combination, the steps of:
  (a) exposing said material to radiation actinic to said material;
  (b) contacting said material with an agent thermically reactable with said material as a function of exposure of said material to said actinic radiation; and
  (c) measuring the temperature change as a function of said exposure of said material during said reaction of said agent with said exposed material.

10. A process as defined in claim 9 wherein said agent thermically reactable with said exposed material is a reducing agent which selectively oxidizes said exposed material as a function of said material's exposure.

11. A process as defined in claim 10 wherein said photosensitive material is photosensitive silver halide.

12. A process as defined in claim 11 wherein said reducing agent is a silver halide developing agent.

13. A process as defined in claim 9 wherein said agent is dispersed in said fluid medium prior to said exposure.

14. A process as defined in claim 9 wherein said measurement of said temperature change comprises measuring the change in temperature of said medium containing said exposed material.

15. A process as defined in claim 9 wherein said actinic radiation is of a selected frequency range.

16. A process as defined in claim 9 wherein said fluid medium containing said photosensitive material is caused to flow in a stream at a substantially uniform rate, said agent is introduced into said stream at a substantially uniform rate and said photosensitive material is exposed by irradiating said stream with radiation actinic thereto.

17. A process as defined in claim 16 wherein said stream containing said photosensitive material is irradiated with said actinic radiation at a location upstream from the location at which said agent is introduced into said stream.

18. A process as defined in claim 16 wherein successive portions of said fluid medium stream containing said photosensitive material are exposed to actinic radiation of selected intensities and the temperature change upon contact of exposed material with said agent at such successive portions is individually measured.

19. A process as defined in claim 16 wherein said measurement generates an electrical signal proportional to said temperature change.

20. A process as defined in claim 19 including the step of amplifying said generated signal.

21. A process as defined in claim 9 wherein said agent is exothermically reactable with said photosensitive material as a function of said exposure.

22. A process for determining the effect of the addition of adjuncts to a photographic emulsion upon the sensitometric characteristics of said emulsion which comprises:
  (a) adding an adjunct to a portion of said emulsion;
  (b) exposing emulsion containing said adjunct to actinic radiation;
  (c) reacting said emulsion with an agent thermically reactable with said emulsion as a function of said exposure; and
  (d) comparing the temperature change as a function of said exposure of said emulsion during said reaction with the temperature change processing a portion of said emulsion to which said adjunct has not been added according to steps (b) and (c).

23. A process as defined in claim 22 wherein said adjunct is added subsequent to said step of exposing said emulsion.

References Cited
UNITED STATES PATENTS

| | | | |
|---|---|---|---|
| 2,590,830 | 3/1952 | Williford et al. | 96—27 XR |
| 3,160,477 | 12/1964 | Wasilewski | 23—253 |
| 3,245,758 | 4/1966 | Benzinger | 23—259 XR |
| 3,436,190 | 4/1969 | Priestly | 23—253 |

MORRIS O. WOLK, Primary Examiner

D. G. MILLMAN, Assistant Examiner

U.S. Cl. X.R.

23—253; 73—15.4; 96—50